(12) United States Patent
Stone et al.

(10) Patent No.: US 8,220,408 B2
(45) Date of Patent: Jul. 17, 2012

(54) UNDERWATER VEHICLE WITH SONAR ARRAY

(76) Inventors: William C. Stone, Del Valle, TX (US); Bartholomew P. Hogan, Rockville, MD (US)

( * ) Notice: Subject to any disclaimer, the term of this patent is extended or adjusted under 35 U.S.C. 154(b) by 692 days.

(21) Appl. No.: 12/179,362

(22) Filed: Jul. 24, 2008

(65) Prior Publication Data

US 2009/0031940 A1 Feb. 5, 2009

Related U.S. Application Data

(60) Provisional application No. 60/953,070, filed on Jul. 31, 2007.

(51) Int. Cl.
*B63G 8/39* (2006.01)
(52) U.S. Cl. .......................... 114/312; 114/330; 114/337
(58) Field of Classification Search .......... 114/312–342; 367/88
See application file for complete search history.

(56) References Cited

U.S. PATENT DOCUMENTS

| | | | | |
|---|---|---|---|---|
| 4,455,962 A | * | 6/1984 | Gongwer | 114/312 |
| 6,802,236 B1 | * | 10/2004 | Richardson | 89/1.13 |
| 7,124,022 B2 | * | 10/2006 | Carmichael et al. | 701/208 |
| 7,505,364 B2 | * | 3/2009 | Polvani | 367/131 |

* cited by examiner

*Primary Examiner* — Edwin Swinehart

(57) ABSTRACT

An underwater vehicle including an axi-symmetric framing system rotatable about a centerline to define a shell of revolution having a uniformly-convex outer boundary. A narrow-beam sonar array is mounted on the axi-symmetric framing system, and includes a multitude of simultaneously-fireable and/or asynchronously-fireable transducers distributed substantially evenly over a 4π-steradian viewing angle. The present invention provides the necessary configuration for a vehicle wherein an internal algorithm can compare a "new" geometry to an "old" geometry collected earlier to construct a best fit of the new world map with the old world map and locate the vehicle within the context of the new world map. This then provides a completely independent mechanism for correction of the gradual drift in x and y that is not dependent on any form of external navigation aid.

13 Claims, 15 Drawing Sheets

UNDERWATER VEHICLE WITH SONAR ARRAY

CROSS-REFERENCES TO RELATED APPLICATIONS

This original nonprovisional application claims the benefit of U.S. provisional application No. 60/953,070, filed Jul. 31, 2007 and entitled "Autonomous Underwater Vehicle for 3D Mapping and Navigation in Labyrinthine Environments," which is incorporated by reference herein.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Grant No. NNG04GC09G awarded by the National Aeronautics and Space Administration.

BACKGROUND OF THE INVENTION

1. Field of the Invention

The present invention relates to the exterior geometry and structural configuration for an underwater vehicle. More specifically, the invention relates to the shape of the vehicle in combination with the positioning of a plurality of sonar devices on the exterior geometry of the vehicle.

2. Description of the Related Art

Autonomous underwater vehicles (AUVs) are common scientific devices used for oceanographic research and bathymetric measurements. Because AUVs are, by definition, unmanned and autonomous, they are ideal for high-risk activities within the depths of the world's oceans. Oil and gas companies, for example, frequently use AUVs to make detailed maps of the seafloor prior to installing the infrastructures for oil rigs and pipelines. AUVs have also been used to map an area to determine whether enemy mines are present. Scientists also frequently use AUVs to study the ocean floor.

AUVs are frequently tasked to autonomously navigate in labyrinthine environments, such as rock caverns, fissures, ice pack cracks, underground flood tunnels, dam bypass tunnels, and underwater structures. In such environments, complicated terrain frequently surrounds the vehicle on all sides. As such, these conditions give rise to certain problems for traditional underwater vehicles.

First, labyrinthine environments create a true three-dimensional navigation problem for AUVs. Because of the presence of these surfaces, it is very unlikely, if not impossible, to obtain continuous or even periodic navigational updates from external navigation sources. It is common, for example, for ocean-going underwater vehicles to periodically surface for the purpose of obtaining a navigation fix from a global positioning system. It is further standard practice in the design of ocean-going underwater vehicles to have as their mission abort mechanism a system that makes the vehicle positively buoyant, so that in the event of a problem it will rise to the surface and initiate communication to indicate its status. In a complex labyrinthine environment, however, the net result would simply be the permanent loss of the very-expensive vehicle.

Traditional AUVs suffer from one additional, and frequently fatal, design flaw for working in labyrinthine environments: They are almost always torpedo shaped—that is, they almost always have long, cylindrical bodies, blunt nose cones, and a single, aft propeller. Moreover, traditional AUVS are generally designed for oceanographic research and bathymetric measurements. As such, they may employ downward-looking swath-type sonar systems (e.g., multibeam, sidescan, acoustic fresnel lens) for their science payload, and possibly a single forward-looking wide beam sonar pinger for obstacle avoidance.

The inappropriateness of this type of design for work within a labyrinthine environment can be appreciated by considering how a vehicle navigation system can be spoofed by complicated ice pressure ridges both on the overhead ice sheet as well as on the floor of an investigation zone beneath either Polar or Antarctic ice sheets—a common area of interest recently in view of the International Polar Year (IPY). AUVs have been lost in such environments and never recovered. Navigational failure in a complicated 3D environment cannot be dismissed when designing a high reliability system to work in such localities. The possible failure of torpedo-architecture AUVs in a labyrinthine environment can be attributed to many factors including lack of complete geometric knowledge of its environment (due to limited geometric sensor capabilities), lack of maneuverability (due to its long shape and aft propulsion package and therefore long turning radius), and failure of any of many single-point systems (e.g. the propeller prop becoming snagged), among many others.

For an AUV to enter into, survive, and safely return from an unexplored labyrinthine environment, it cannot rely on traditional approaches to navigation alone. Traditionally, a vehicle uses a combination of depth sensors, inertial sensors, and Doppler velocity logs (DVLs) to compute a dead-reckoned estimate of its position. With high accuracy attitude and depth sensors, most of the uncertainty in the vehicle's 3D pose (x, y, z, roll, pitch, yaw) is in the x- and y-directions. Because dead-reckoning error will compound with time, and there will be no opportunity for pose correction from an external source—GPS, for example, will not penetrate ice nor rock—the vehicle must use something else to obtain a positive lock on its pose. In fact, it is crucial for minimization of uncertainty that the geometric sensors provide the most accurate possible true registered values of the local geometry within the $4\pi$ steradian solid viewing angle around the vehicle. Stated in simpler words, the vehicle's sensors must look simultaneously in all directions about the vehicle, preferably with data coming from sensor pointing directions radially separated by approximately uniform solid angles.

There are essentially six variations of sonar transducers: (1) single beam, unfocused; (2) Mills Cross multibeam; (3) interferometric sidescan; (4) acoustic fresnel lens; (5) 3D multibeam; and (6) narrow beam, focused. The first sensor (single beam, unfocused) is essentially the old spherical wave depth sounder and it will produce fictitious results from all but a flat, planar surface. The next three (multibeam, sidescan, acoustic fresnel lens) are swath imaging systems that scan a thin, wide fan from the vehicle and the vehicle must translate to produce a valid image. While indispensible for bathymetric surveying of essentially 2½ D ocean floor topography, they are bulky instruments that cannot effectively (both physically and from a cost perspective) cover a $4\pi$ steradian solid viewing angle about a vehicle. Further, in a labyrinthine environment, these approaches are particularly susceptible to multipath spoofing and will therefore generate false input data leading to loss of pose lock.

3D multibeam imagers can simultaneously image a large number of points within a nominal field-of-view (FOV) of around a 50×50 degree solid angle, and, therefore, theoretically could be discretely arrayed around a vehicle to obtain the required $4\pi$ steradian real-time geometry. These devices, however, rely on a reasonable degree of phase coherence to operate and multipath returns from a labyrinthine environment serve to corrupt phase coherence.

The last sensor type—focused and stabilized narrow beam sonar—provides a characteristic that is uniquely-suited to obtaining true geometry in a labyrinthine environment. The very narrow (less than two-degree solid angle) beam ensonifies a very small area relative to the reference sphere of the vehicle and the returns are easily distinguished from other transducers, even in a highly-irregular labyrinthine environment, provided the transducer solid angle separation is greater than about ten degrees between sensors. Further, and equally importantly, this class of sensors (single transducer, narrow beam) can be split from the normal method of sonar manufacture (in which the transducer contains its own case with associated electronics as an integrated, blocky housing) and divided into component elements in which the transducer (projector/hydrophone combination) can be produced as a low profile flat disk that can be connected to a remote digital signal processor (DSP) by a long conductor (up to 2.5 m or more depending on frequency of operation). This very significant factor allows one to "pave" the exterior hydroshell surface of the invention with a uniform solid angle field of sonar rangers.

Finally, because each transducer can be provided with its own DSP chip within a rugged remote electronics housing protected in the core of the vehicle, and because the signals coming back only represent the returns from a very small ensonified area, the ability to reject, in real-time, any multipath or spurious echoes is very powerful. As a result, fifty to one-hundred good, true real-time data returns spread evenly over a $4\pi$ steradian solid viewing angle relative to the vehicle centroid leads to reliable convergence far better than tens of thousands of points that are corrupted by multipath.

BRIEF SUMMARY OF THE INVENTION

The present invention is designed to work and survive within complicated labyrinthine environments where there are no navigational aids available other than the instrumentation that is carried aboard the vehicle and there is no possibility for an abort to the surface in the event of trouble. The present invention can be implemented in several ways—either using a frame to support the imaging transducers such that their active surface is on the exterior of the hydroshell geometry, or by physically mounting the transducers in a surface mount style directly attached to an outer boundary of the vehicle and is made of some type of impact resistant material.

The present invention provides the necessary configuration for a vehicle wherein an internal algorithm can compare a "new" geometry to an "old" geometry collected earlier to construct a best fit of the new world map with the old world map and locate the vehicle within the context of the new world map. This then provides a completely independent mechanism for correction of the gradual drift in x and y that is not dependent on any form of external navigation aid.

According to one aspect of the invention, the underwater vehicle comprises an axi-symmetric framing system rotatable about a centerline to define a shell of revolution having a uniformly-convex outer boundary and a center. A narrow-beam sonar array is mounted to the axi-symmetric framing system and includes a plurality of simultaneously-fireable and/or asynchronously-fireable transducers distributed substantially evenly over a $4\pi$-steradian viewing angle.

DETAILED DESCRIPTION OF THE INVENTION

Figure 1:
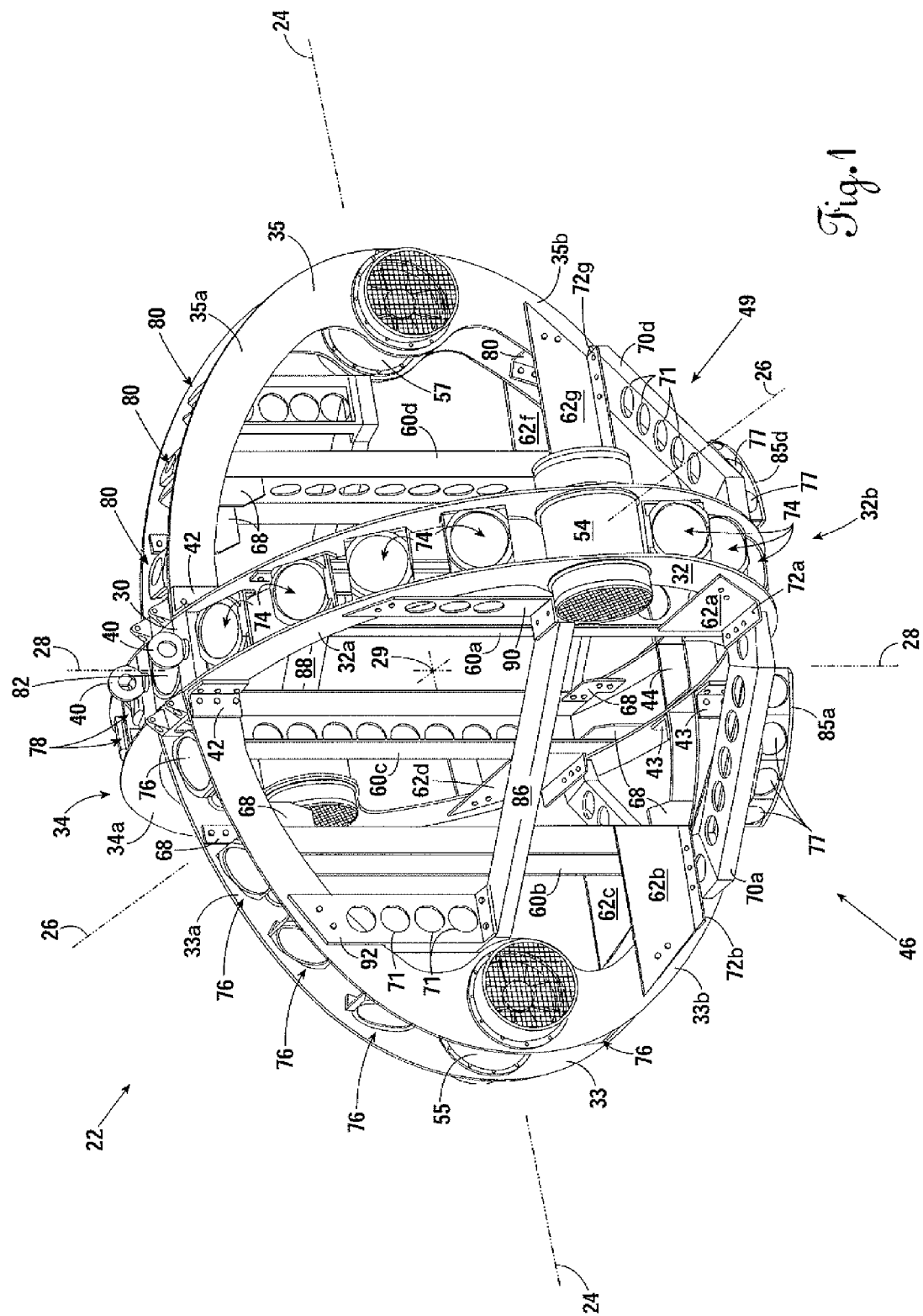
FIG. 1 is an isometric front top view of an axi-symmetric framing system and narrow beam sonar array of the preferred embodiment of the present invention.
Figure 2:
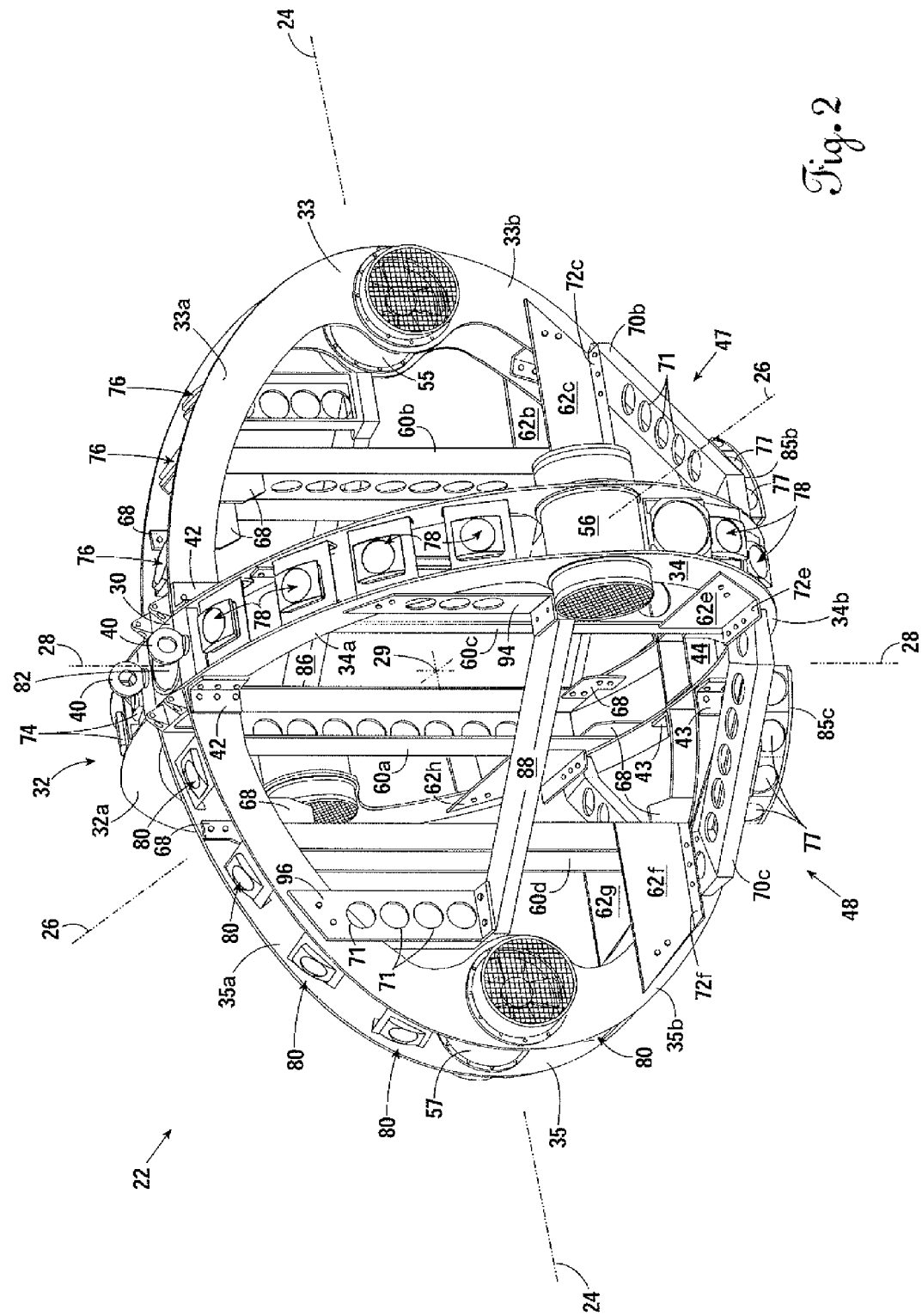
FIG. 2 is an isometric rear top view of an axi-symmetric framing system and narrow beam sonar array of the preferred embodiment.

FIG. 1 and FIG. 2 are an isometric top front view and an isometric top rear view, respectively, of the axi-symmetric framing system 22 of the preferred embodiment of the present invention. The axi-symmetric framing system 22 is described with reference to an x-y-z coordinate system having an x-axis 24, a y-axis 26, and a z-axis 28, such that rotation of the framing system 22 about the z-axis 28, or "centerline," which intersects with the center 29 of the framing system 22, defines a uniformly-convex shell of revolution. By containing the subsystems and science payload of the vehicle within this shell of revolution, the vehicle has no "port," "starboard," "bow," nor "stern," and thus can maneuver at will in the yaw degree of freedom—that is, rotation about the centerline 28 that generated the shell of revolution. Moreover, a uniformly-convex topology serves to reduce possible catch points on the vehicle—thus, spheres, oblate spheroids, ellipsoids and even cylinders with rounded edges or domed cylinders all work well in this capacity. From a hydrodynamic standpoint, however, a flattened ellipsoid, as described with reference to the preferred embodiment, will lead to less hydrodynamic drag, and therefore a vehicle with greater range and/or greater sustainable velocity for a given onboard power supply.

In addition, an axi-symmetric vehicle with no projecting objects extending beyond the shell takes very little energy to set it in a spinning motion or to stop it precisely at a particular yaw angle. Similarly, because there are no projecting appendages beyond the shell of revolution, there is no safety penalty for spinning the vehicle, because there is nothing to catch on obstacles. Moreover, the effect of spinning serves to reduce the number of transducers needed to build a very high resolution map about the vehicle, as will be described in greater detail hereinafter.

The framing system 22 includes an upper base member 30 to which has been joined a first, second, third and fourth framing subsystem 32-35. Two hoist eyebolts 40 are attached to the upper base member 30 for hoisting during pre-mission and post-mission operations. Four L-brackets 42 interconnect the first through fourth framing subsystems 32-35, with one L-bracket 42 positioned between each adjacent pair of framing subsystems 32-35. Similarly, each of the framing subsystems 32-35 are joined to a lower base member 44 with L-brackets 43.

The first through fourth framing subsystems 32-35 define first through fourth quadrants 46-49 wherein: the first quadrant 46 is the volume of the shell of revolution between the first and second framing subsystems 32, 33 (see FIG. 1); the second quadrant 47 is the volume of the shell of revolution between the second and third framing subsystems 33, 34 (see FIG. 2); the third quadrant 48 is defined as the volume of the shell of revolution between the third and fourth framing subsystems 34, 35 (see FIG. 2); and the fourth quadrant 49 is the volume of the shell of revolution between the first and fourth framing subsystems 35, 36 (see FIG. 1). The boundaries between the quadrants 46-49 intersect the x-z axis and y-z axis planes.

Each framing subsystem 32-35 forms a half ellipse such that, when assembled, the first and third framing subsystems 32, 34—in combination with the upper and lower base members 30, 44—define a complete ellipse in the x-z axis plane, and the second and fourth framing subsystems 33, 35—also in combination with the upper and lower base members 30, 44—define a complete ellipse oriented perpendicularly to the first and third framing subsystems 32, 34 and in the y-z axis plane.

Bi-directional circumferential thrusters 54-57 are disposed within each framing subsystem 32-35 to cause the vehicle to rotate about the centerline 28 in either the clockwise or counterclockwise direction. Each circumferential thruster 54-57 is positioned within its corresponding framing subsystem 32-35 at the distal point of its major axis, and is oriented to provide thrust in the two directions perpendicular to such major axis (i.e., either the x-axis 24 or the y-axis 26). Specifically, a first circumferential thruster 54 is positioned within the first framing subsystem 32 and oriented to provide thrust in a direction perpendicular to the y-axis 26 (see FIG. 1). A second circumferential thruster 55 is positioned in the second framing subsystem 33 and oriented to provide thrust in a direction perpendicular to the x-axis 24 (see FIG. 1 & FIG. 2). A third circumferential thruster 56 is positioned in the third framing subsystem 34 and oriented to provide thrust in a direction perpendicular to the y-axis 24 (see FIG. 2). A fourth circumferential thruster 57 is positioned in the fourth framing subsystem 35 and oriented to provide thrust in a direction perpendicular to the x-axis 24 (see FIG. 1 & FIG. 2).

By positioning the circumferential thrusters 54-57 distally from the centerline 28, torque provided by the circumferential thrusters 54-57 about the centerline 28 is maximized. Positioning the circumferential thrusters 54-57 distally from the centerline 28 also results in an orientation causing thrust to be provided substantially in the x-y axis plane—as opposed to a parallel plane either above or below the x-y axis plane. In addition, by positioning the circumferential thrusters 54-57 within the framing subsystems 32-35, the inner volume of the shell of revolution remains more available for the vehicle subsystems and science payload, as will be described hereinafter. The circumferential thrusters 54-57 can be actuated individually, or in combination to provide greater torque.

Movement of the vehicle in the x- or y-direction is controlled by selectively actuating the circumferential thrusters 54-57. For example, to move along the x-axis 24, the first and third circumferential thrusters 54, 56 may be actuated to provide thrust in the same direction, and, because the circumferential thrusters 54, 56 are bidirectional, thrust may be provided in either direction along the x-axis 24. Similarly, to move along the y-axis 26, the second and fourth circumferential thrusters 55, 57 may be actuated simultaneously to provide thrust in the same direction. In addition, movement along an axis between the x- and y axes, 24, 26 may be provided by actuating all four circumferential thrusters 54-57, and by altering the amount of thrust provided by the first and third circumferential thrusters 54, 56 relative to the second and fourth circumferential thrusters 55, 57.

The axi-symmetric framing system 22 shown in FIG. 1 and FIG. 2 garners additional stability from a plurality of interconnected vertical and horizontal bracing members, as each framing subsystem 32-35 includes a vertical bracing member connected between an upper portion and a lower portion of the corresponding framing subsystem 32-35. More specifically, a first vertical bracing member 60*a* interconnects the upper portion 32*a* and lower portion 32*b* of the first framing subsystem 32. A second vertical bracing member 60*b* interconnects the upper portion 33*a* and lower portion 33*b* of the second framing subsystem 33. A third bracing member 60*c* interconnects the upper portion 34*a* and lower portion 34*b* of the third framing subsystem 34. A fourth vertical bracing member 60*d* interconnects the upper portion 35*a* and lower portion 35*b* of the fourth framing subsystem 35. Each of the first through fourth vertical bracing members 60*a*-60*d* are attached to the upper portions 32*a*-35*a* and lower portions 32*b*-35*b* of the respective framing subsystem 32-35 with a plurality of mounting brackets 68 using conventional fastening techniques.

Horizontal bracing members 62*a*-62*h* connect the vertical bracing members 60*a*-60*d* to the lower portions 32*b*-35*b* of each of the framing subsystems 32-35. In detail, the first vertical bracing member 60*a* is connected to the lower portion 32*b* of the first framing subsystem 32 with two horizontal bracing members 62*a*, 62*h*. The second vertical bracing member 60*b* is connected to the lower portion 33*b* of the second framing subsystem 33 with two horizontal bracing members 62*b*, 62*c*. The third vertical bracing member 60*c* is connected to the lower portion 34*b* of the third framing subsystem 34 with two horizontal bracing members 62*d*, 62*e*. The fourth vertical bracing member 60*d* is connected to the lower portion 35*b* of the fourth framing subsystem 35 with two horizontal bracing members 62*e*, 62*f*.

As shown in FIG. 1 and FIG. 2, the preferred embodiment provides four lower beam members 70*a*-70*d* for supporting a science payload or vehicle subsystem and for mounting clusters of sonar transducer modules. Each of the lower beam members 70*a*-70*d* is connected to a mounting lip of two corresponding horizontal bracing member 62*a*-62*h*. Specifically, as shown in FIG. 1, the first lower beam member 70*a* spans between the mounting lips 72*a*, 72*b* of two horizontal bracing members 62*a*, 62*b*, respectively. As shown in FIG. 2, the second lower beam member 70*b* is connected between the mounting lips 72*c*, 72*d* of two horizontal bracing members 62*c*, 62*d*, respectively, and the third lower beam member 70*c* is connected between the mounting lips 72*e*, 72*f* of two horizontal bracing members 62*e*, 62*f*. Again referring to FIG. 1, the fourth lower beam member 70*d* is attached between the mounting lips 72*g*, 72*h* of two horizontal bracing members 62g, 62h, respectively. Attachment of the lower beam members 70a-70d is to the corresponding mounting lips 72a-72h is accomplished through conventional fastening techniques.

The vertical bracing members 60a-60d and lower beam members 70a-70d may include a plurality of holes 71 to decrease the mass of the vehicle without affecting its structural integrity. Such a decrease in mass positively affects performance characteristics of the vehicle by requiring less energy to maneuver in an operating environment. In addition, handling the vehicle during pre- and post-mission operations is safer and easier.

The preferred embodiment comprises narrow-beam sonar array positioned on the axi-symmetric framing system 22 that includes a plurality of simultaneously-fireable and/or asynchronously-fireable transducers distributed substantially evenly over a 4π-steradian viewing angle. More specifically, a first plurality of transducer modules 74 is positioned within the first framing subsystem 32 and is oriented to project substantially within the y-z axis plane and radially outwardly from the framing system 22. A third plurality of transducers modules 78 is positioned within the third framing subsystem 34 and oriented to project substantially within the y-z axis plane and radially outwardly from the framing system 22. In similar fashion, a second and fourth plurality of transducer modules 76, 80 are positioned within the second and fourth framing subsystems 33, 35, respectively, are oriented to project substantially within the x-z axis plane and radially outwardly from the framing system 22. Upper base transducer module 82 is positioned within the upper base members 30 to project radially outwardly along the centerline 28. In addition to the first through fourth pluralities of transducer modules 74, 76, 78, 80, four clusters 85a-85d of lateral imaging traducer modules are affixed to the lower beam members 70a-70d, respectively, with each cluster 85a-85d comprising a plurality of individual fine imaging transducers 77 oriented at substantially even angles of separation within a plane that is parallel to the x-y axis plane. The location of this plane within the vehicle is arbitrary with respect to its position along the vehicle z-axis. However, the location is advantageously either above or below the thrust plumes from the horizontal thrusters.

In the preferred embodiment, any given plane of transducers modules (e.g., the first and third pluralities of transducer modules 74, 78 that occupy the y-z plane, or the second and fourth pluralities of transducer modules 76, 80 that occupy the x-z plane) contains twenty transducers at approximately eighteen-degree radial spacing. However, because there is duplication at the upper and lower base members 30, 44, only fifty-four actual transducers are required. Each transducer can be fired simultaneously at cycle rates in excess of 10 Hz if needed. Each beam typically is about two degrees wide (solid angle cone), with a range resolution of one-and-a-half centimeters and a maximum range of around two hundred meters.

The sonar array is configured on the axi-symmetric framing system 22 to collect a significant number of points that cover a solid angle comprising 4π steradians around the vehicle, such that approximately half of the sensors are creating a new map of the unexplored world into which the vehicle is entering while the remaining half of the sensors are re-mapping the area previously explored (just seconds before). Thereafter, the vehicle can solve a 3D optimization problem to obtain the least error from matching the "new" 3D maps with the "old" 3D maps, and thence locate itself within the context of that map. A solution for this optimization problem does not require enormous numbers of points—in fact, additional points lead to a cubical expansion in DSP processor time as a function of the number of points collected. The acquisition of fifty to one-hundred simultaneous geometry points spread approximately uniformly over a 4π-steradian solid angle about the vehicle will permit a spherical error probable (SEP) of one meter to be routinely obtained using 200 m-range narrow beam sonars—that is, fifty to one-hundred physical transducers spread uniformly about the vehicle are preferred.

Still referring to FIG. 1 and FIG. 2, to support various subsystems and science payload, two middle beam members 86, 88 are positioned within the first and third quadrants 46, 48 of the sphere of revolution, respectively. As shown in FIG. 1, the first middle beam member 86 is suspended from first and second bracket members 90, 92, to which the first middle beam member 86 is fastened using conventional fastening techniques. The first and second bracket members 90, 92 are fastened to the upper portions 32a, 33a of the first and second framing subsystem 32, 33, respectively. As shown in FIG. 2, the second middle beam member 88 is suspended from third and fourth bracket members 94, 96, to which the second middle beam member 88 is fastened using conventional fastening techniques. The third and fourth bracket members 94, 96 are connected to the upper portions 34a, 35a of the third and fourth framing subsystems 34, 35, respectively.

Figure 3:
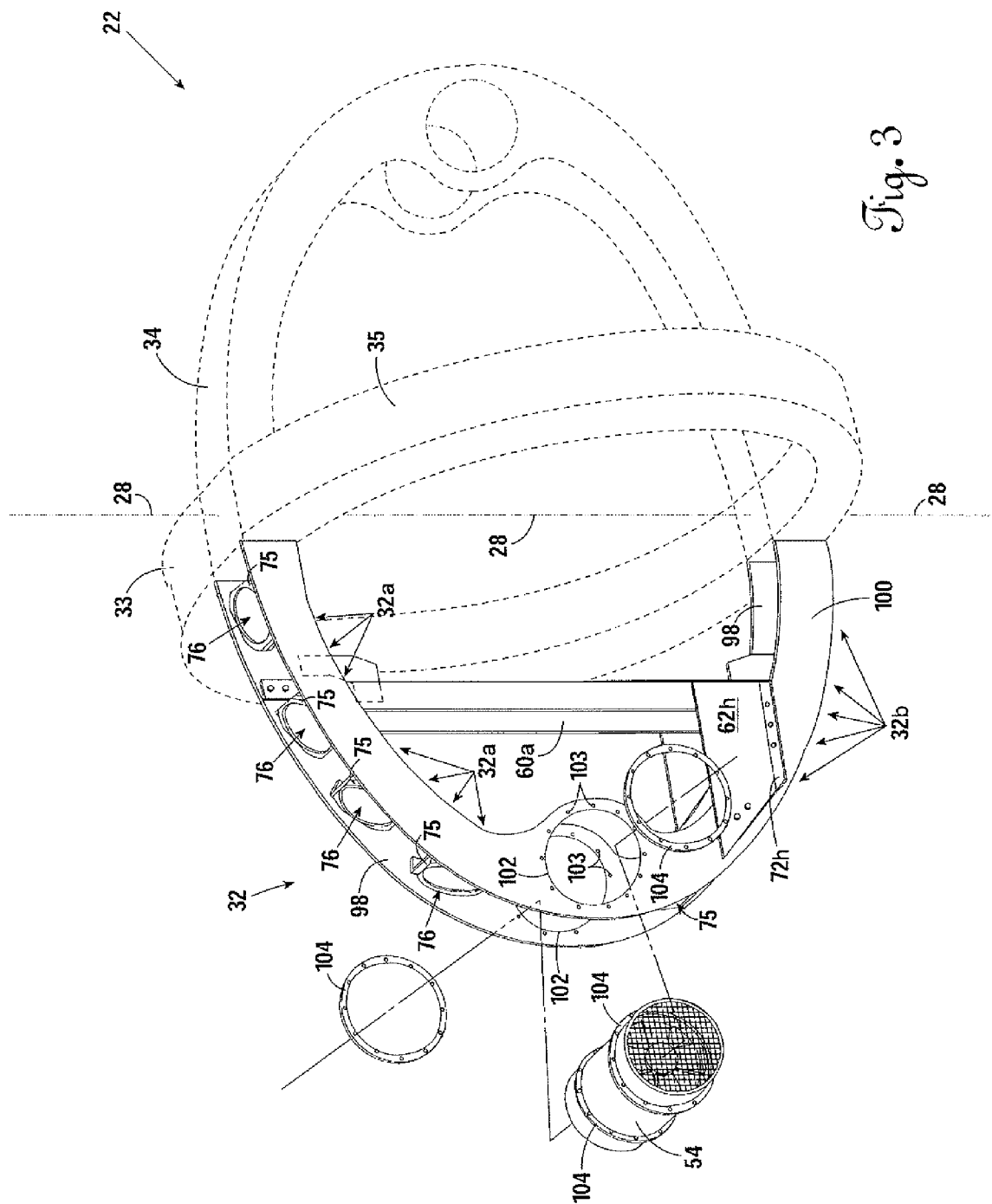
FIG. 3 is an isometric front top view of a framing subsystem of the preferred embodiment.
Figure 4:
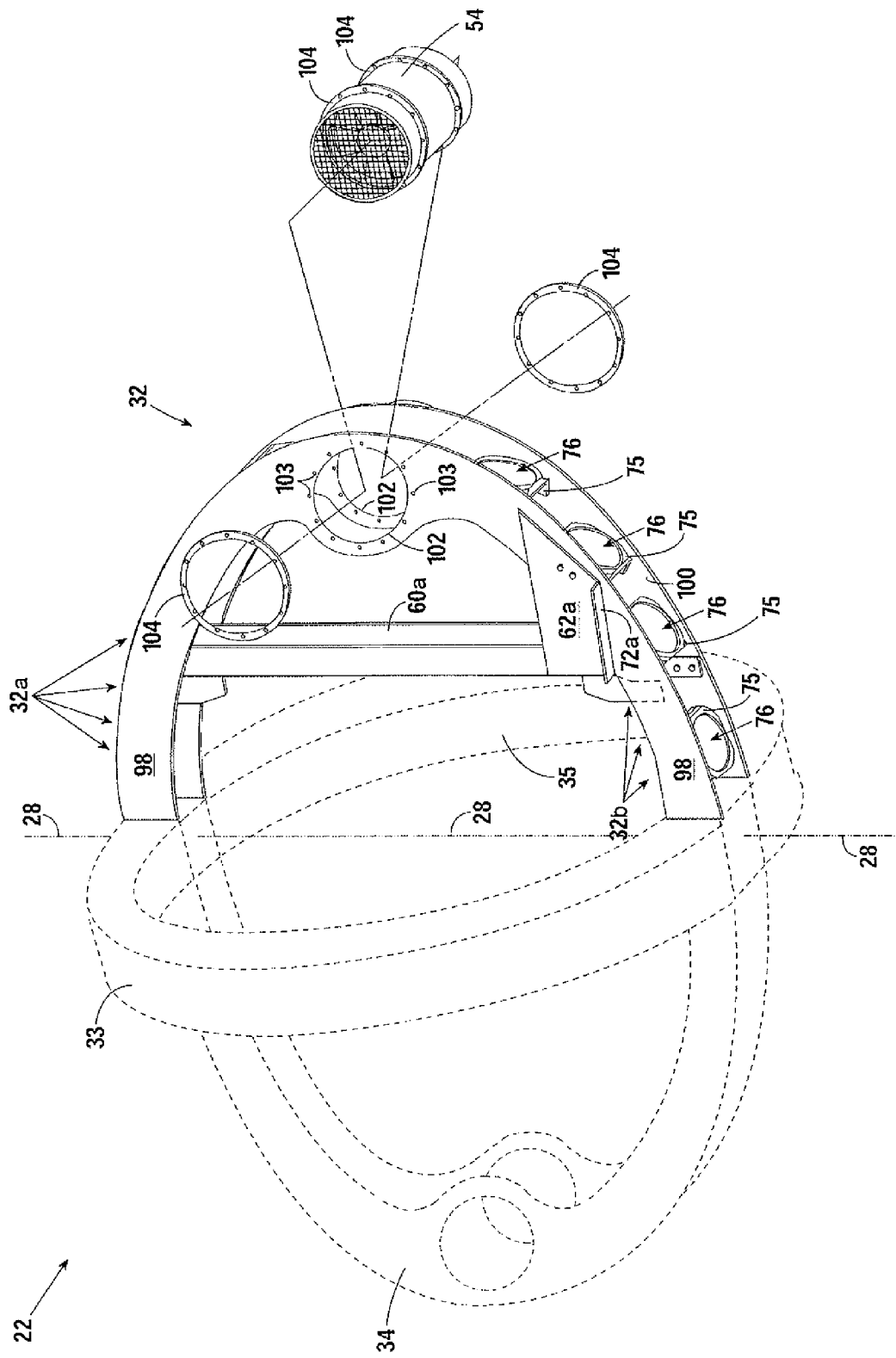
FIG. 4 is an isometric bottom rear view of the framing system depicted in FIG. 3.

FIG. 3 and FIG. 4 are isometric front top and isometric rear bottom views, respectively, of the first framing subsystem 32. Because the first through fourth framing subsystems 32-35 are identically constructed in the preferred embodiment, only the first framing subsystem 32 is described in detail, although the relative positions of the other framing subsystems 33-35 are shown by hidden lines.

The first framing subsystem 32 comprises first and second frame members 98, 100 that are identically sized and shaped as a semi-ellipses. The first and second frame members 98, 100 each include a thruster mounting hole 102 disposed therethrough. The first circumferential thruster 54 is bolted into the thruster mounting holes 102 using multiple flange members 104 connected through a plurality of bolt holes 103 disposed circumferentially around the thruster mounting hole 102.

Each transducer module 76 positioned in the first framing system 32 is fastened to the first and second frame members 98, 100 through a mounting bracket 75. Conventional fastening means such as bolts and nuts may be used. The vertical bracing member 60a is also mounted between the upper and lower portions 32a, 32b of the first framing subsystem 32 using conventional fastening means. Two horizontal bracing members 62a, 62h connect to the vertical bracing member 60a using conventional fastening means, wherein each horizontal bracing member 62a, 62b includes a mounting lip 72a, 72h for connection to a lower beam member (not shown), as described with reference to FIG. 1 and FIG. 2.

Figure 5:
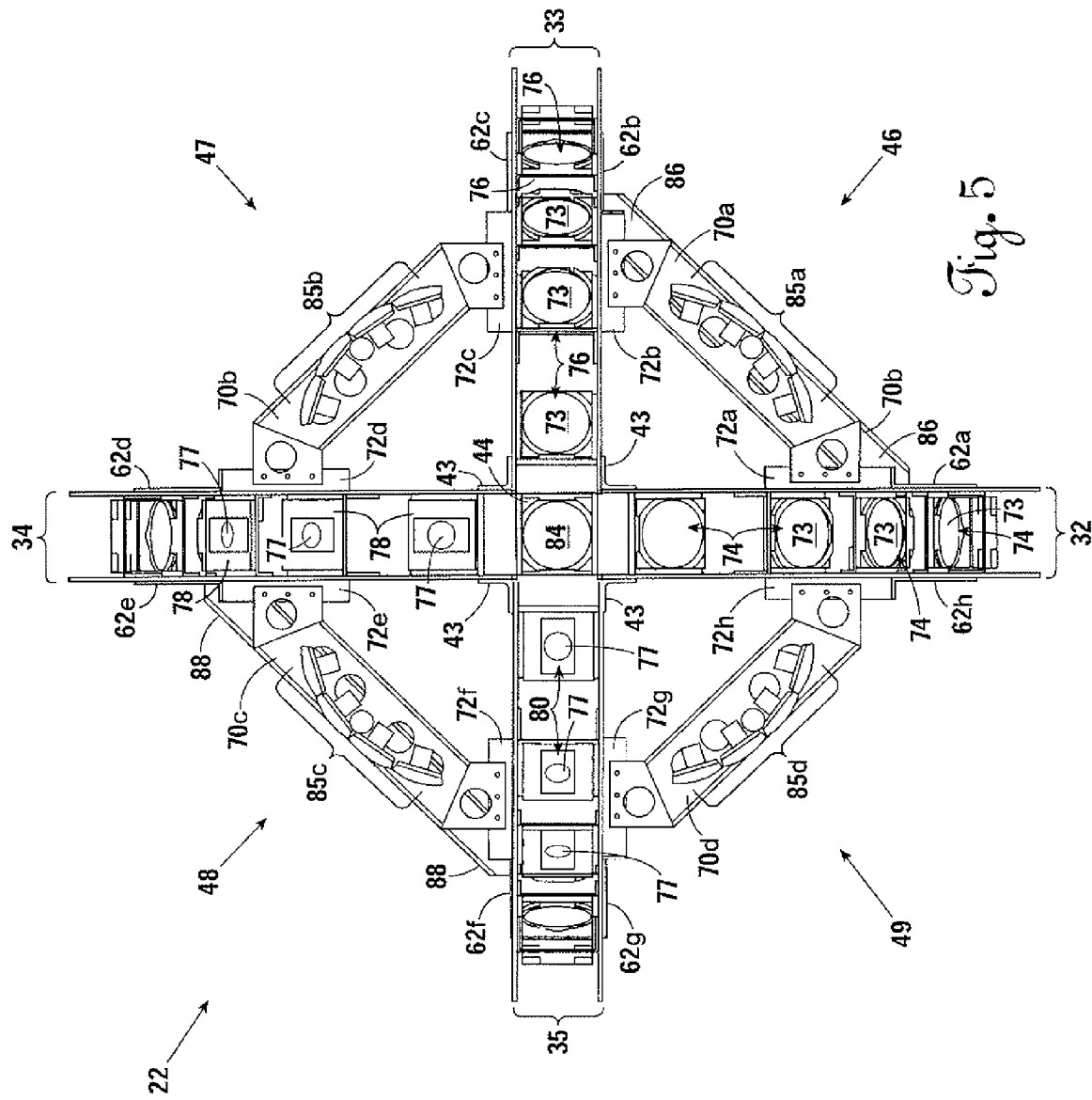
FIG. 5 is a bottom elevation of the axi-symmetric framing system shown in FIG. 1 and FIG. 2.

FIG. 5 is a bottom elevation view of the axi-symmetric framing system 22 of the preferred embodiment wherein, for clarity, the circumferential thrusters 54-57 are not shown. As noted hereinabove, the first through fourth framing subsystems 32-35 are connected to the lower base member 44 with four lower L-brackets 43. The mounting lips 72a-72h for each of the horizontal bracing members 62a-62h provide the attachment point for the first through fourth lower beam members 70a-70d, respectively. More specifically, first lower beam member 70a occupies the first quadrant 46 and is attached to the mounting lips 72a, 72b of the horizontal bracing member 62a, 62b. The second lower beam member 70b occupies the second quadrant 47 and is attached to the mounting lips 72c, 72d of the horizontal bracing members 62c, 62d. The third lower beam member 70c occupies the third quadrant 48 and is attached to the mounting lips 72e, 72f of the horizontal bracing members 62e, 62f. The fourth lower beam member 70d occupies the fourth quadrant 49 and is attached to the mounting lips 72g, 72h of the horizontal bracing members 62g, 62h.

First and second middle beam members 86, 88 occupy the first and third quadrants 46, 48 respectively. The first beam member 86 is anchored to the first and second framing subsystems 32, 33. The second beam member 88 is anchored to the third and fourth framing subsystems 34, 35, as described with reference to FIG. 1 and FIG. 2.

As noted hereinabove, the sonar array is configured on the axi-symmetric framing system 22 to collect a significant number of points that cover a solid angle comprising $4\pi$ steradians around the vehicle such that approximately half the sensors are creating a new map of the unexplored world into which the vehicle is entering, while the remaining half of the sensors are re-mapping the area previously explored. Thus, in the preferred embodiment the first and second pluralities of transducer modules 74, 76 are configured substantially as obstacle avoidance transducers 73, while the third and fourth pluralities of transducers modules comprise a plurality of fine-imaging transducers 77. The lower base transducer 84 is of the obstacle avoidance class. In actual practice, the reported ranges from all of the above-described transducers will be fed into the real-time geometry-based navigation system previously described. Some sensors, as designated by the term "obstacle avoidance" transducers are as well, simultaneously published to a software routine that is directly concerned with real-time raw transducer ranges to the nearest obstacle, irrespective of the creation of the 3D map and the localization process associated with that map.

First, second, third, and fourth clusters 85a-85d of horizontally-aligned fine imaging transducers 77 are mounted to the first, second, third and fourth lower beam members 70a-70d, respectively. The first through fourth pluralities of vertically-aligned transducer modules 74, 76, 78, 80 are positioned within each of the first through fourth framing subsystems 32-35, respectively, and are oriented to produce and receive sonar projections substantially within the x-z axis and y-z axis planes at substantially equal angles of separation. Each transducer module includes a transducer configured as a low-profile flat disk that can be connected to a remote digital signal processor (DSP) located elsewhere within the vehicle. Accordingly, separate DSP stacks are connected to the transducers composing the sonar array to receive the reflected sonar signals and perform the necessary processing (e.g., real-time rejection of multipath or spurious echoes).

FIG. 6 through FIG. 10 illustrate how the axi-symmetric framing system 22 allows placement of the vehicle subsystems within the shell of revolution. All housings depicted in FIG. 6 through FIG. 10 are pressure rated to the maximum operating depth of the vehicle 20 and can be designed for full ocean depth pressures. The individual housings are electrically connected to other housings, to sensors, and to actuators (e.g. thrusters, solenoids, valves, pumps, etc.) via underwater electrical cables with detachable fittings that allow any individual cable to be removed, inspected, or replaced between missions.

Figure 6:
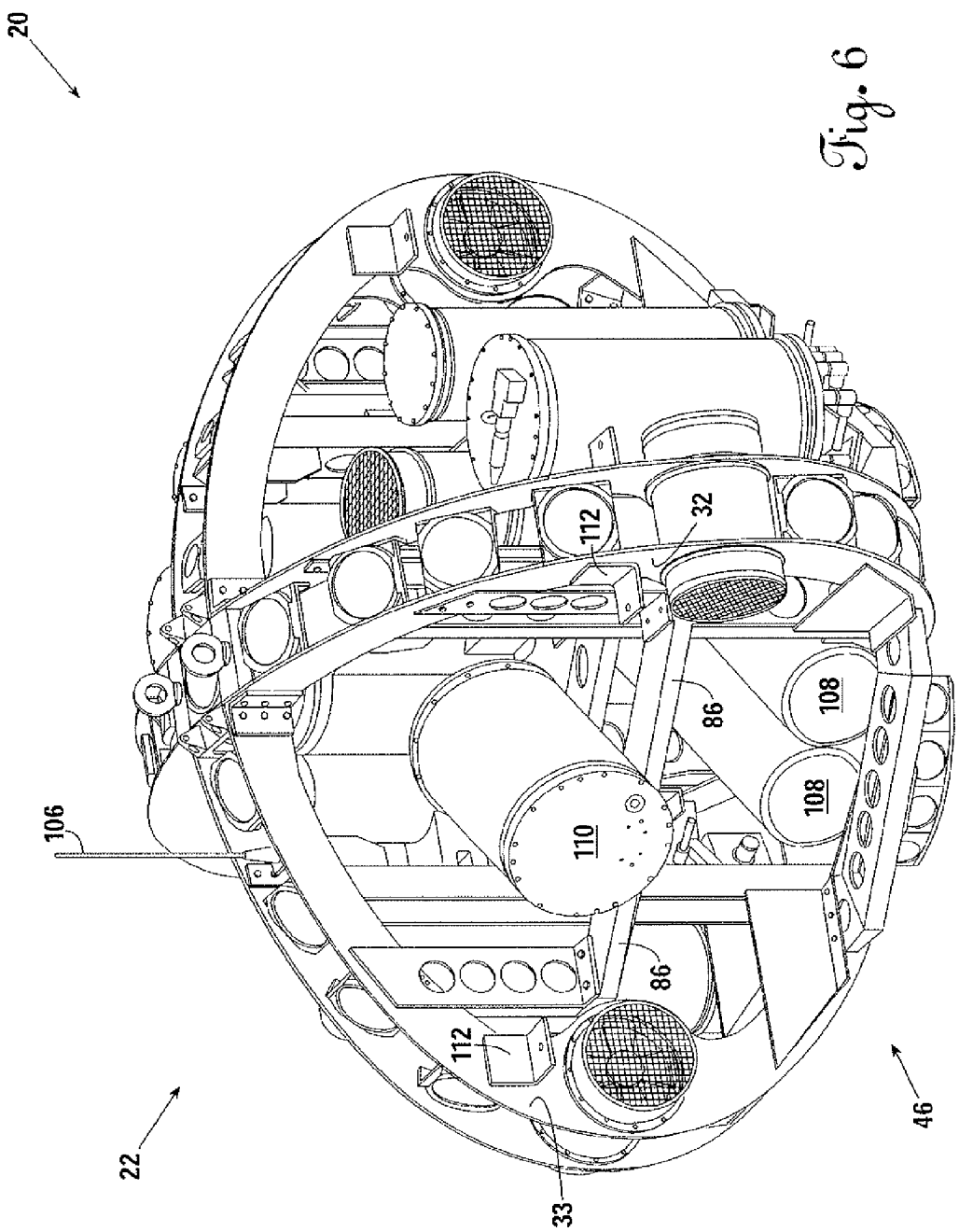
FIG. 6 through FIG. 8 are isometric top views of the first, second, and third quadrants, respectively, of the preferred embodiment.

FIG. 6 is a top isometric view of a first alternative embodiment disclosing the subsystems contained by the first quadrant 46 of the vehicle 20. An antenna 106 mounted to the second framing subsystem 33 provides for surface-based wireless communication to and from the vehicle 20, such as downloading data and uploading new software or firmware. Power is provided to the vehicle by two lithium-ion power supplies 108 mounted in the lower portion of the first quadrant 46 and third quadrant 48 (see FIG. 8). The lithium-ion power supplies 108 are preferred for the present invention because they are rechargeable, and provide a favorable energy-to-weight ratio relative to other power supplies. An inertial measurement unit 110 incorporating a ring laser gyroscope is mounted to the first middle beam member 86 and occupies the upper portion of the first quadrant 46. Two mounting brackets 112 attached to the first and second framing subsystems 32, 33 provide mounting points for a flotation panel.

Figure 7:
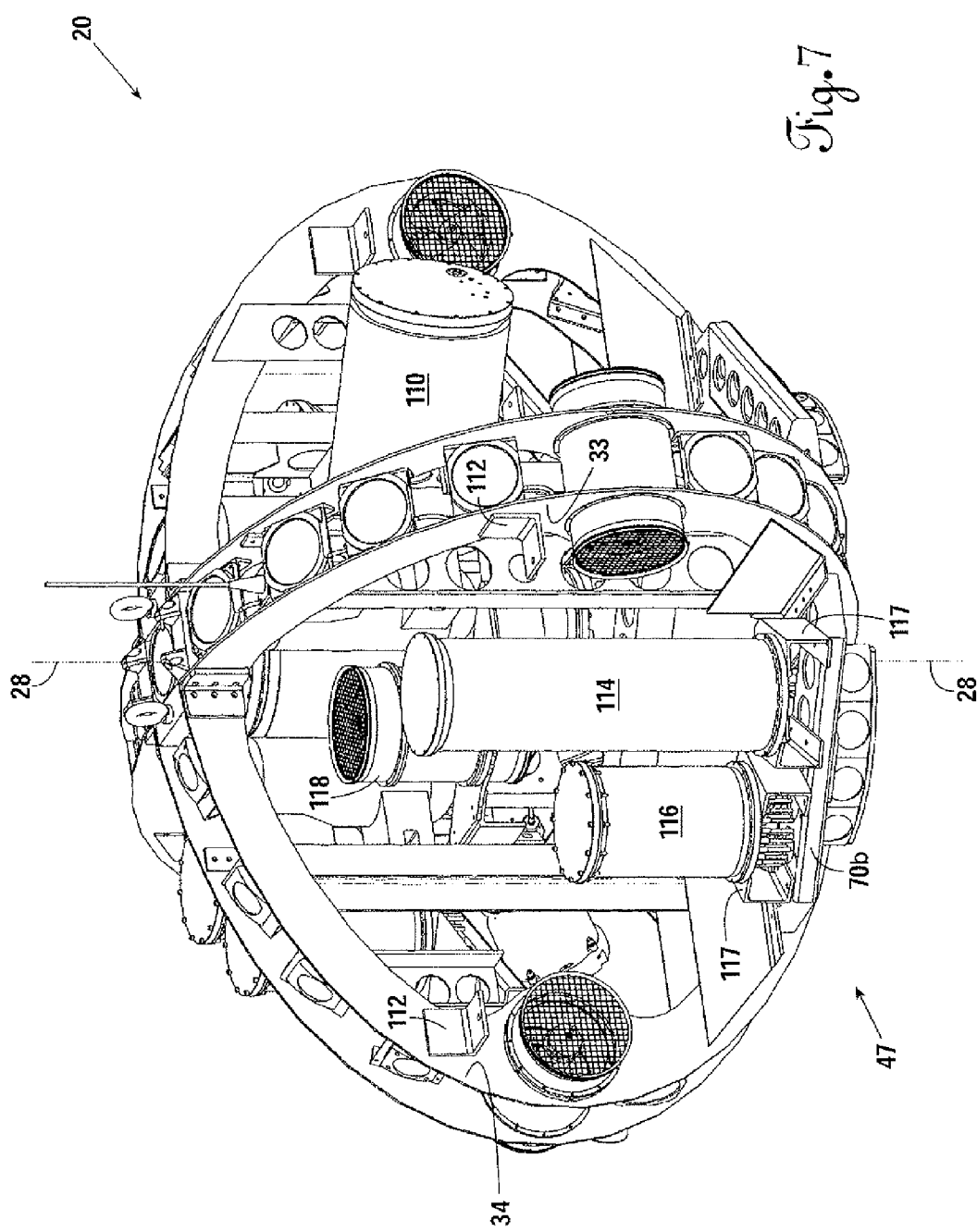

FIG. 7 is a top isometric view of the preferred embodiment disclosing the subsystems within the second quadrant 47. A motor controller system 114 and variable buoyancy subsystem 116 are secured via mounting brackets 117 to the second lower beam member 70b. In addition, a first vertical thruster 118 is mounted proximally to the centerline 28 and oriented to provide thrust in a direction substantially parallel thereto. Two mounting brackets 112 are attached to the second and third framing subsystems 33, 34 to provide mounting points for a flotation panel.

Figure 8:
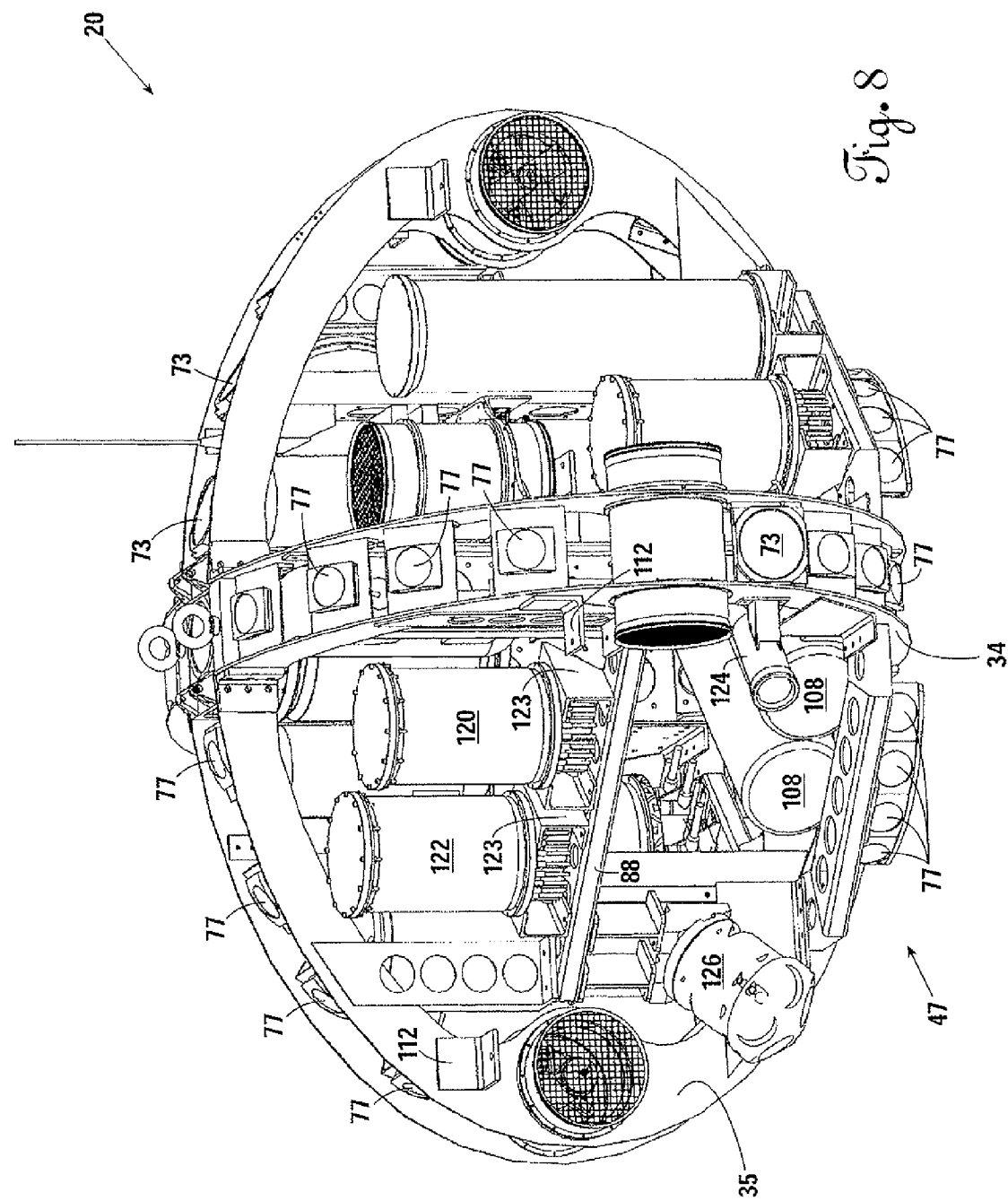

FIG. 8 is a top isometric view of the preferred embodiment disclosing the subsystems within the third quadrant 48. First and second sonar DSP stacks 120, 122 are secured via mounting brackets 123 to the second middle beam member 88 and connected to the sonar array disposed around the framing system 22. According to the preferred embodiment, the first sonar DSP stack 120 is in communication with the obstacle avoidance transducers 73 and the second sonar DSP stack 122 is in communication with the fine imaging transducers 77. A wide-field color camera 124 is mounted to the third framing subsystem 34 and contained within the third quadrant 47 of the shell of revolution. A Doppler velocity log 126 is mounted to the fourth framing subsystem 35. The lithium-ion power supplies 108 occupy a portion of the third quadrant 47. Two mounting brackets 112 secured to the third and fourth framing subsystems 34, provide mounting points for a flotation panel.

Figure 9:
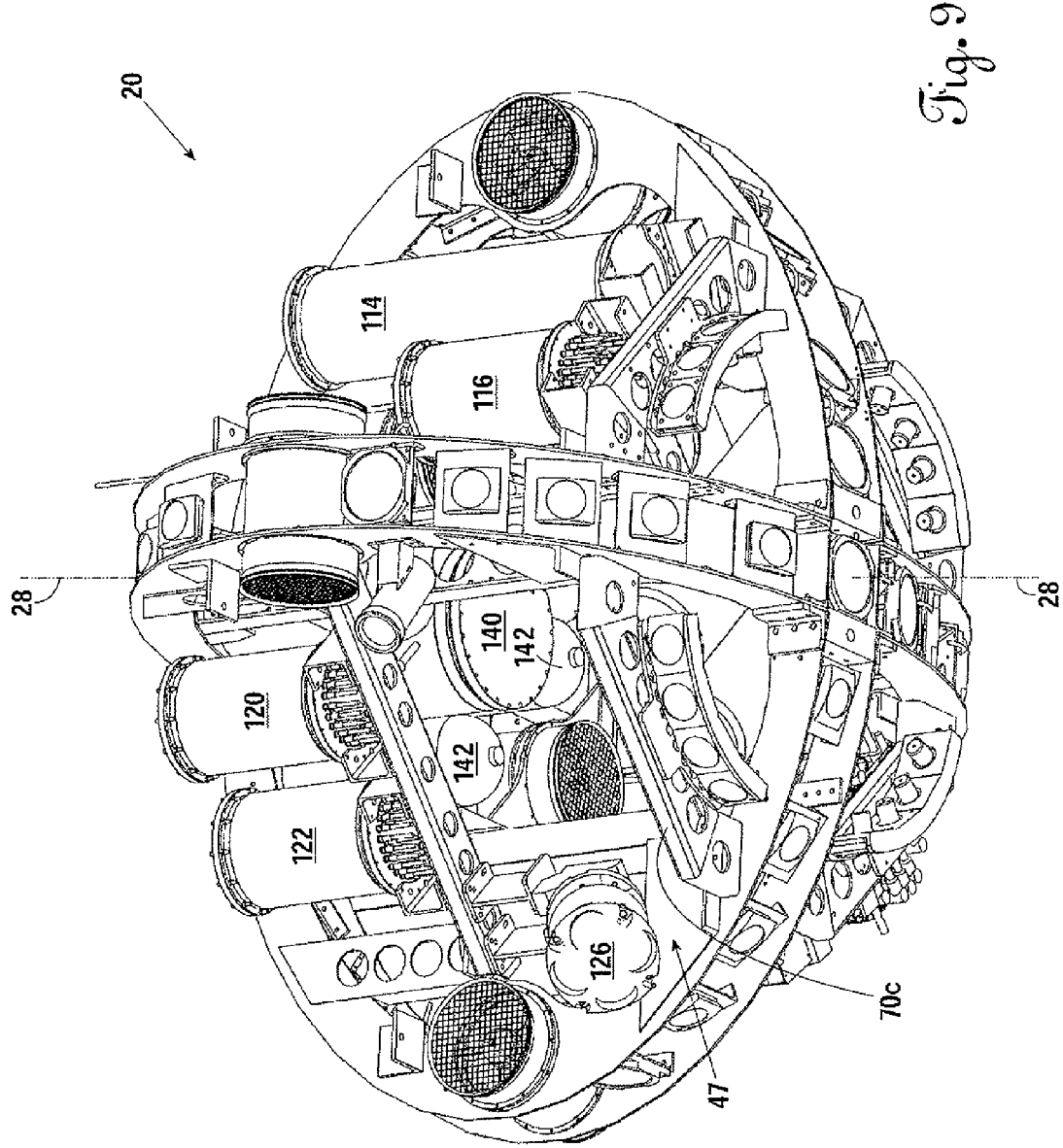
FIG. 9 is an isometric bottom view of the third quadrant of the preferred embodiment.

FIG. 9 is a bottom isometric view of the third quadrant 47 showing, in greater detail, the location the subsystems contained therein. In the preferred embodiment, the third lower beam member 70c does not support any of the vehicle subsystems, but rather may optionally support a science probe. A ballast chamber 140 and gas supply tank 142 are connected to the variable buoyancy subsystem 116 (see FIG. 7) to provide the vehicle 20 with buoyancy control. Additional gas supply tanks 142 are positioned adjacent the ballast chamber 140.

Figure 10:
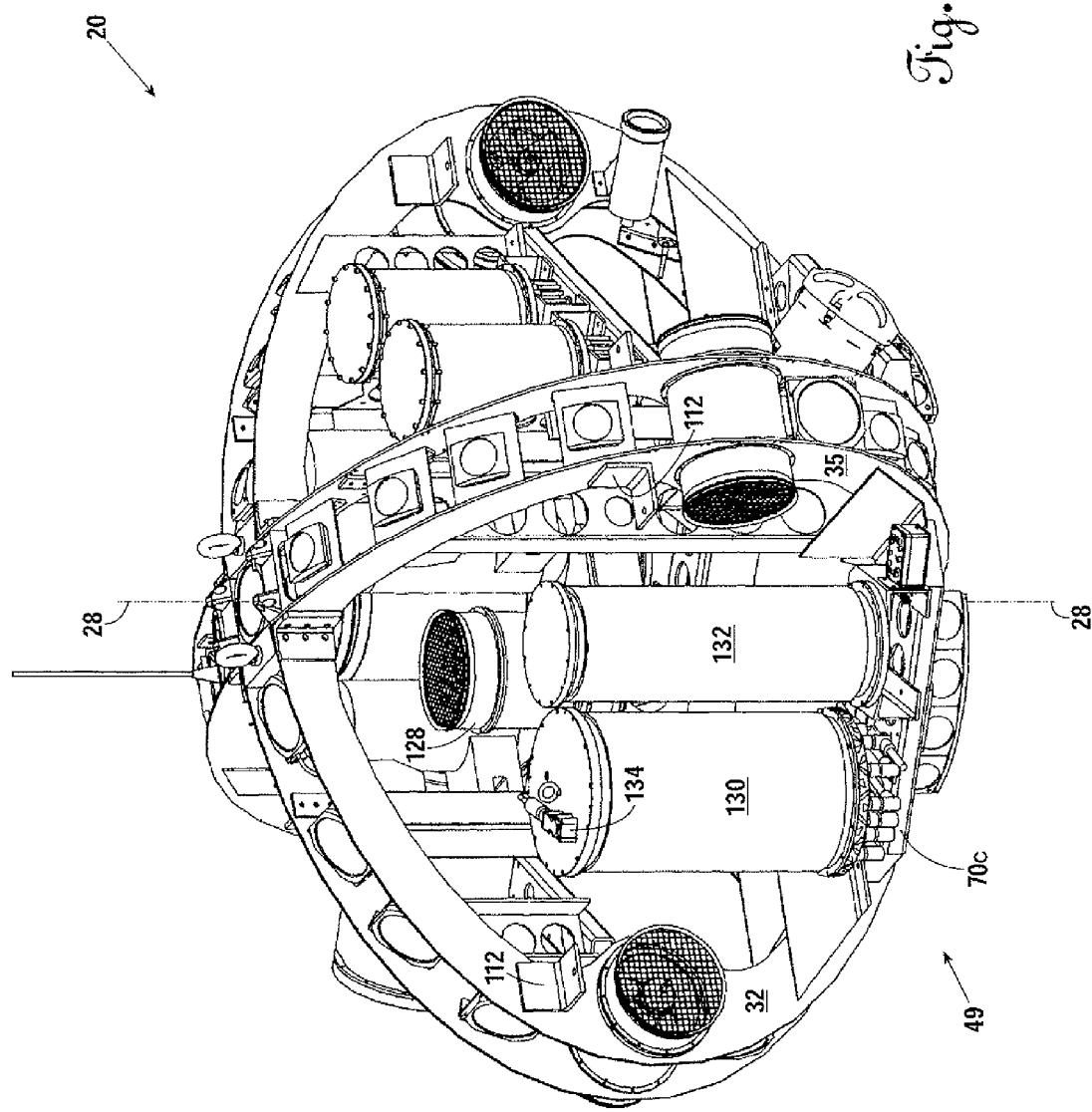
FIG. 10 is an isometric top view of the fourth quadrant of the preferred embodiment.

FIG. 10 is a top isometric view of the preferred embodiment disclosing the subsystems of the fourth quadrant 49. A second vertical thruster 128 is mounted proximally to the centerline 28 and oriented to provide thrust in a direction substantially parallel thereto. The fourth quadrant 49 includes a main processor bank 130 and the science payload processor bank 132. A fiber optic data link port 134 provides a physical interface to the surface, although is not used during autonomous missions. The corresponding data link may be used, for example, to observe the vehicle's autonomous decision-making during testing as well as for signaling an emergency stop to a mission. Two mounting brackets 112 provide mounting points attached to the first and fourth framing subsystems 32, 35 provide mounting points for a flotation panel.

Figure 11:
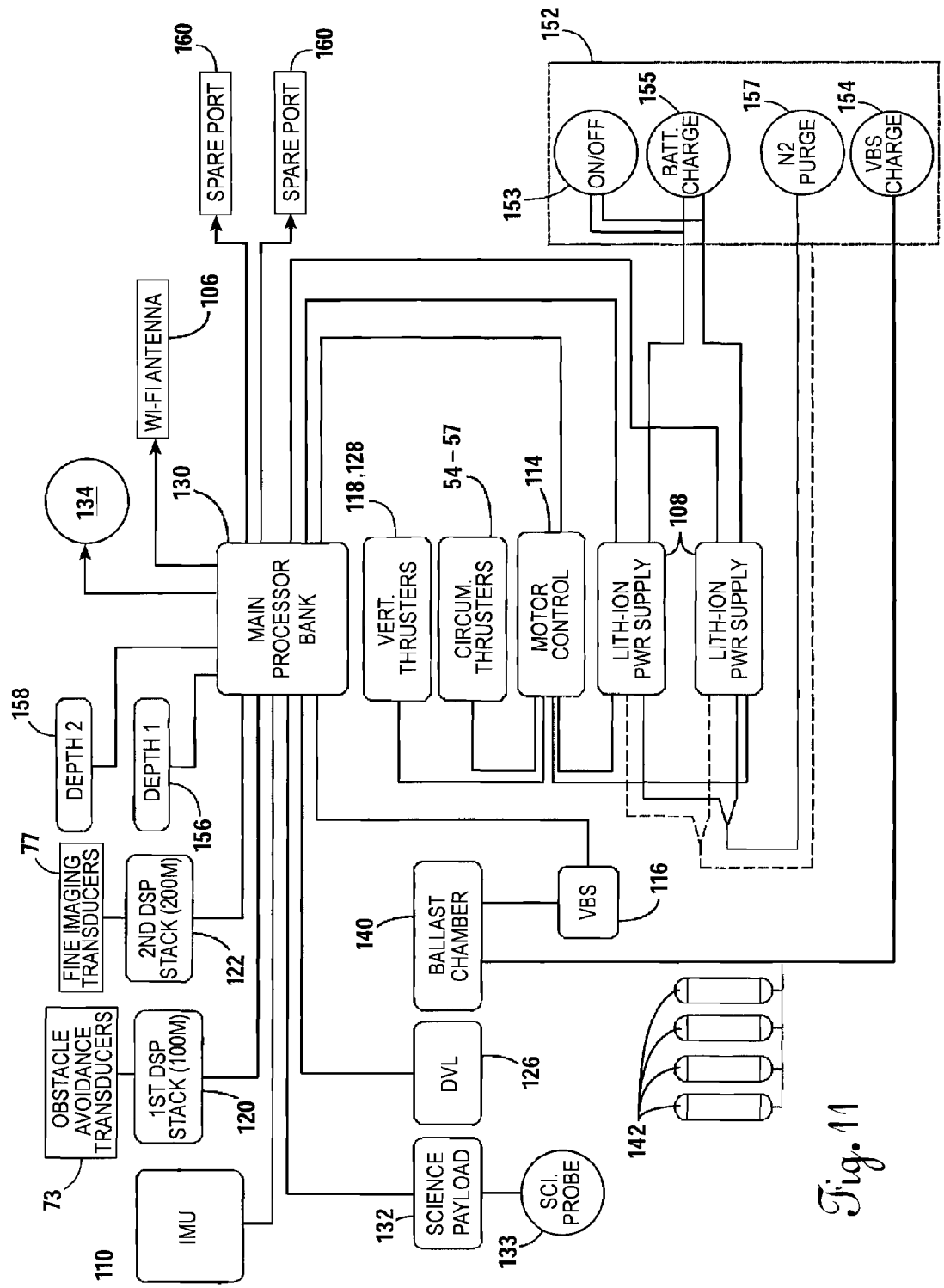
FIG. 11 is a block diagram showing the functional relationship between the various vehicle subsystems and science payload.

FIG. 11 is a block diagram showing the functional relationship between the various subsystems of the preferred embodiment. The main processor bank 130 manages the various functions of the vehicle and provides various communication links to the system components. The motor control system 114 is connected to the main processor bank 130 to control each of the circumferential thrusters 54-57 and first and second vertical thrusters 118, 128. Movement of the vehicle an the x- or y-direction can controlled by managing which of the circumferential thrusters 54-57 are actuated and in which direction, as described hereinabove with reference to FIGS. 1 and 2. The lithium-ion power supplies 108 provide power directly to the motor control system 114 as well as to the main processor bank 130.

The main processor bank 130 is also in communication with the variable buoyancy system (VBS) 116 to control the buoyancy of the vehicle. Upon receiving instruction from the main processor bank 130, the VBS 116 opens a valve to cause gas communication from gas supply tanks 142 to the ballast chamber 140 to vary the buoyancy of the vehicle as needed. As gas is moved to the ballast chamber 140, the gas expands causing the buoyancy of the vehicle to increase. A gas charge port 154 for recharging the gas supply tanks 142 is available at an external interface block 152, which also provides an external on/off switch 153 and battery charge port 155. An N2 gas charge port 157 provides communication for nitrogen to and from the lithium-ion power supplies 108.

The main processor bank 130 is also in communication with the Doppler velocity log (DVL) sensor 126. The DVL bounces sound off of the bottom and can determine the velocity vector of the vehicle as it moves relative to the seafloor. It can also determine the vehicle's velocity vector by reflections of its acoustic transmissions from fine sediment in the water column independently of maintaining a direct lock on a physical surface (wall, ceiling, or floor). This information can be combined with a starting position fix to calculate the position of the vehicle.

The main processor bank 130 is also in communication with the inertial measurement unit (IMU) 110, which works by detecting the current rate of acceleration and changes in rotational attributes, including pitch, roll and yaw. This data is then fed into a main processor bank 130, which uses the data to calculate the current position of the vehicle. The IMU 110 detects accelerations which are integrated by a guidance computer to deduce the position and velocity of the vehicle.

The main processor bank 130 is also in communication with the science payload processor bank 132, which in turn may be in communication with an attached science probe 133. The science probe 133 may include various functionality, including (1) a wall sampler provide the ability to acquire specimens of wall material, sediment, or water; (2) a wall ranger that provides end-of-probe distance measurement to a wall; (3) a video camera that provides images of the sampling region during the sampling process for probe position and/or control; (4) a site light for illumination the sampling sight; and (5) a water column sampler for acquire a single water column sample, which can then be returned to analysis in a controlled laboratory environment.

A variety of additional vehicle subsystems are also connected to the main processor bank 130. The obstacle avoidance transducers 73 and fine-imaging transducers 77 are in communication with first and second DSP stacks 120, 122. In addition, first and second high resolution digital depth sensors 156, 158 are in communication with the main processor bank 130. Communication to the surface may be made using the fiber optic port 134 and/or WiFi antenna 106 via Ethernet 10/100 interfaces. The main processor bank 130 also provides two spare ports 160, which may be used for auxiliary instrumentation or sensors, if needed, on a mission specific basis.

During operation, the main processor bank 130 in combination with the first and second DSP stacks 120, 122 causes the obstacle-avoidance and fine-imaging transducers 73, 77 to fire at a regular rate. In the structural configuration described with reference to the preferred embodiment, approximately half of the transducers will be targeted toward an as-of-yet unexplored region, while the remaining transducers will be targeted toward a recently-explored region. As the underwater vehicle moves through the environment, the unexplored region becomes the recently explored region.

Each of the transducers, 73, 77 is triggered at regular intervals (e.g., 10 Hz) simultaneously with the other transducers to generate a very narrow (e.g., less than two-degree solid angle) beam that ensonifies a very small area relative to the shell of revolution of the vehicle. Depending on the nature of the environment, it may be desirable to asynchronously trigger the individual transducers to further reduce the chance of multipath degradation of the quality of the ground truth map. Both simultaneous and asynchronous transducer firings are considered acceptable implementations of the invention. This characteristic allows the returns to be easily distinguished from the other transducers, even in a highly-irregular labyrinthine environment, provided the transducer solid angle separation is greater than about ten degrees between sensors. Because the signals coming back only represent the returns from a very small ensonified area, the ability to reject, in real-time, any multipath or spurious echoes is very powerful. Thereafter, the main processor bank 130 uses internal algorithm to compare the "new" geometry to the "old" geometry collected earlier to construct a best fit of the "new" geometry with the "old" geometry and to locate the vehicle within the context of the new geometry. This then provides a completely independent mechanism for correction of the gradual drift in the x- and y-direction that is not dependent on any form of external navigation aid.

Due to the operating environment of the vehicle, electrical and communication connections between pressure housings must be water tight to extreme depths. Therefore, a number of specialized high reliability bulkhead connectors and cables are used, including open face pressure-rated SeaCon MINK-10-FCRL, MING-19-FCRL, and MINM-4-FCRL bulkhead penetrators and their associated cable connectors as well as OptoLinnk fiber optic bulkhead penetrators. Alternative embodiments of the invention, however, may use comparable high reliability bulkhead connectors and associated cable connectors.

Figure 12:
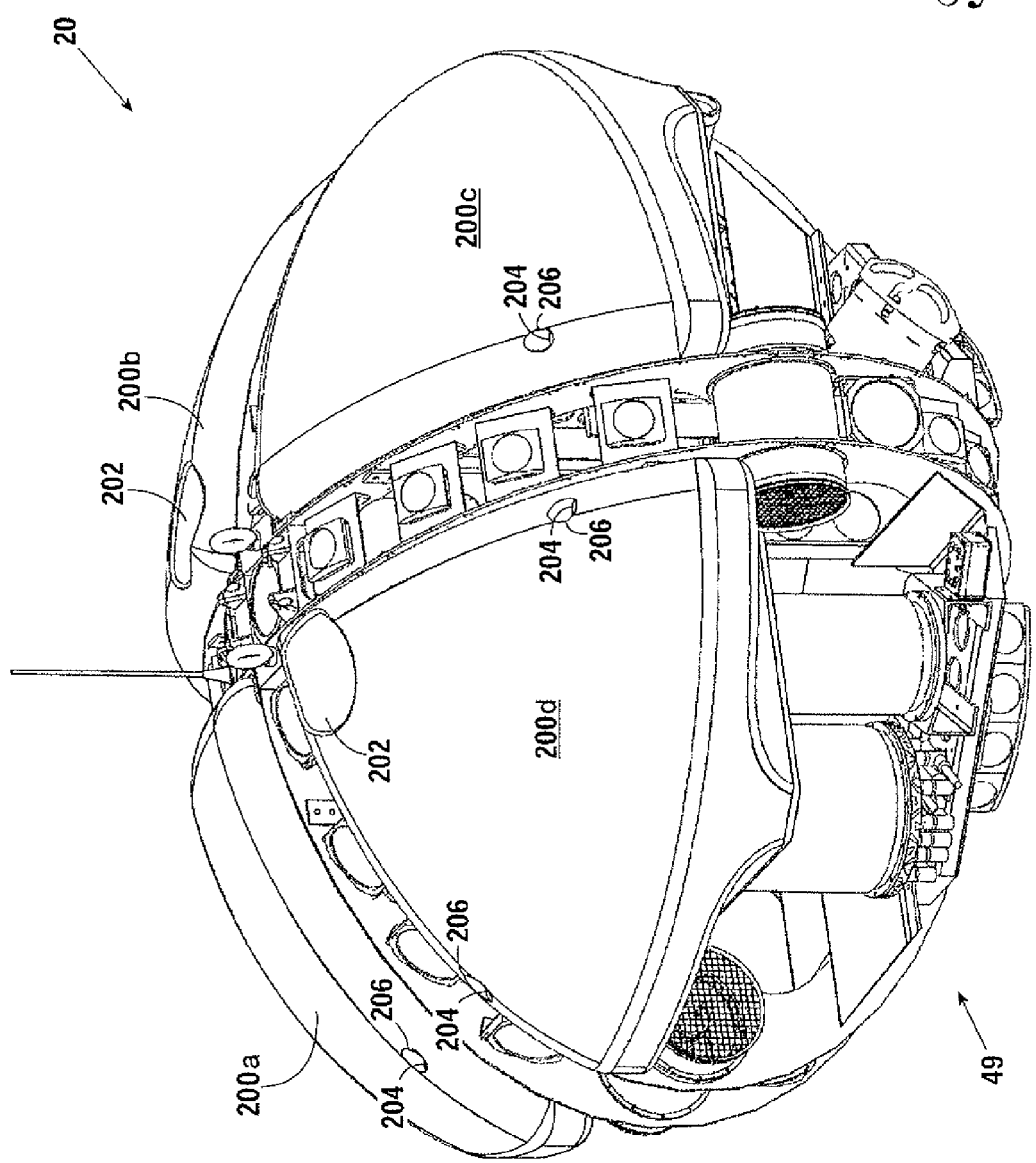
FIG. 12 is a isometric top view of the preferred embodiment showing the flotation panels.

FIG. 12 is a top isometric view toward the fourth quadrant 49 of the preferred embodiment wherein four flotation panels 200a-200d have been installed over each quadrant of the vehicle 20. The flotation panels 200a-200d are fastened to the mounting brackets 112 (not shown) attached to the framing subsystems 32-35 (see FIGS. 6-9) using bolts 204 disposed through bolt holes 206. The second and fourth panels 200b, 200d provide vertical thruster port holes 202 to allow water displaced by the vertical thrusters to egress and/or ingress the shell of revolution. Because of the geometry of the axi-symmetric framing system 22, each flotation panel 200a-200d can be readily removed post mission to permit unfettered access to any of the interior pressure housings that contain the electronics. In alternative embodiments, the pressure housings may be configured to "swing out" to provide access. In the preferred embodiment, the flotation panels 200a-200d are syntactic foam, although other suitable materials may be used.

It is sometimes advantageous to remove the pitch and roll degrees of freedom from the control loop because, from a map making and navigation standpoint, there is little need to control those two variables. The removal of these degrees of freedom can be most readily achieved by placing the flotation panels 200a-200d at the top of the vehicle 20 and ballast (usually lead, but also the vehicle power supply does this very well) at the nadir point of the vehicle 20. This leads to a "stiff" vehicle behavior in those two degrees of freedom. However, if one were to have one or more unique extension appendages for performing various proximity operations tasks, then it could be advantageous to have a vehicle that was inertially-balanced on all axes of rotation so that the vehicle could yaw, pitch, and roll with very little energy input. This is a natural extension of the concept of an axi-symmetric vehicle, but it is particularly applicable to a spherical vehicle. This might have application, for example, where a probe or actuator that is extended from within the vehicle must maintain perpendicularity to an object whose slope angle changes (for example, a ship hull).

The embodiment makes use of the sensors that provide input into both control and navigation filters. The primary dead-reckoning sensors are the high-grade inertial measurement unit 110, the Doppler velocity log 126, and the two high grade depth sensors 156, 158 (see FIG. 11). A new dead-reckoned position estimate may be derived.

Under certain circumstances, dead reckoning navigation can provide good, but not perfect, navigation, approaching a divergence rate of 0.5% of distance traveled. The present invention is designed for an eight hour mission at an average cruising speed of two-tenths of a meter per second, and thus an exploration range of approximately fifty-seven hundred meters. Over this range, a best case scenario anticipates a divergence of thirty meters, which is unacceptable in a fully 3D labyrinthine environment. Moreover, such a divergence is truly a best-case scenario given that data is lost by the DVL (e.g., from noise, switching from water column tracking to wall tracking, and loss of lock when too close to a surface). Thus, for reliable navigation in unknown 3D territory, additional tools are needed.

Figure 13:
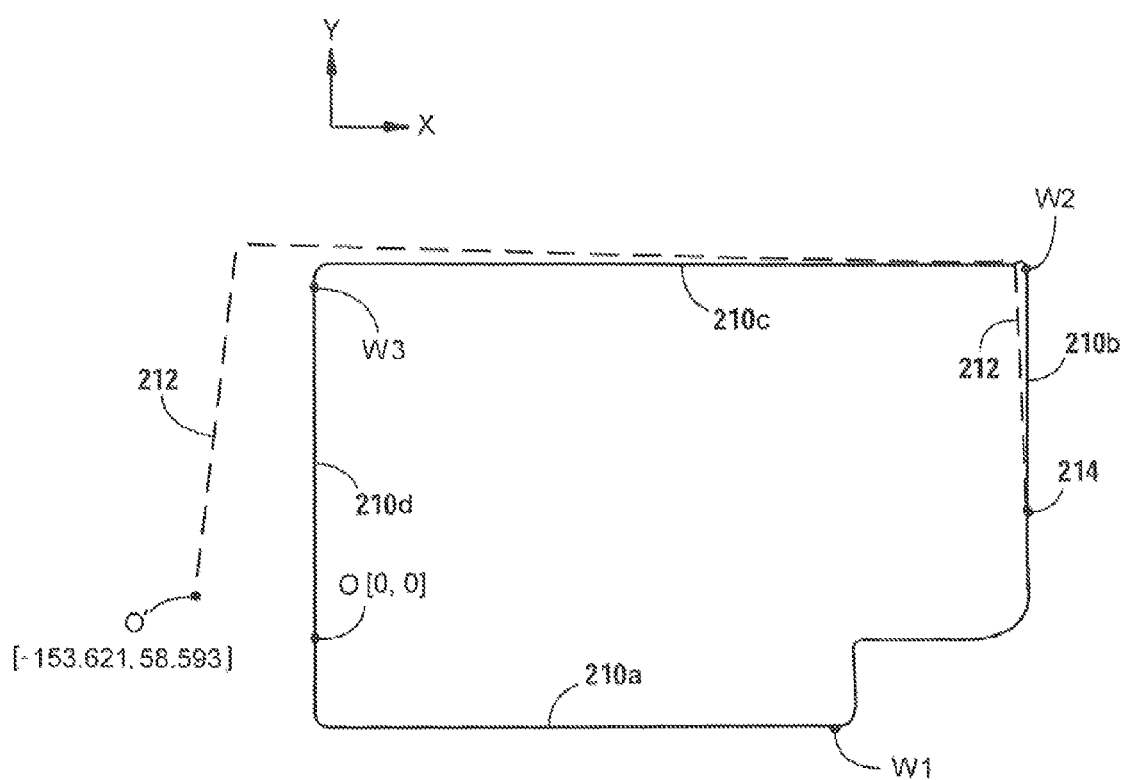
FIG. 13 shows an example of drift in an x-y plane in using an inertial measurement unit (IMU) only dead-reckoned positioned estimate during a thirty-minute closed loop 210 made up of path segments 210a-210d.

FIG. 13 shows an example of drift in an x-y plane in using an IMU-only dead-reckoned position estimate during a thirty-minute closed loop 210 made up of path segments 210a-210d. The vehicle starts at an origin O having a relative position of [0,0], and travels along a first path segment 210a to waypoint W1. The vehicle then travels along a second path segment 210b to waypoint W2, and along a third path segment 210c to waypoint W3. Finally, the vehicle travels along a fourth path segment 210d back to the origin O. The true surveyed vehicle trajectory is the closed loop 210 formed by the first, second, third, and fourth path segments 210a-210d, but the IMU-recorded trajectory, however, results in a calculation that the vehicle is at position O' [−153.621 58.593] and took path 212, initially diverging from the true path 210 at a divergence point 214.

To supplement dead reckoning navigation, the present invention also implements a 3D simultaneous localization and mapping (SLAM) process that builds a map of the vehicle's environment from sensor data while simultaneously using that map to localize the vehicle. More specifically, the process is a data driven representation of the vehicle's environment in which the vehicle control circuitry uses a probabilistic algorithm to track a best estimate of the vehicle trajectory (pose) and a 3D map of the environment.

The sonar measurements are noisy and unable to resolve fine features, but over time they do provide information about the environment around the vehicle. In order to combine the individual sonar measurements, the embodiment uses a 3D evidence grid, where space is uniformly discretized into cubic voxel elements. As measurements are made, the evidence they provide about the occupancy of each voxel is inserted into the map.

Figure 14A:
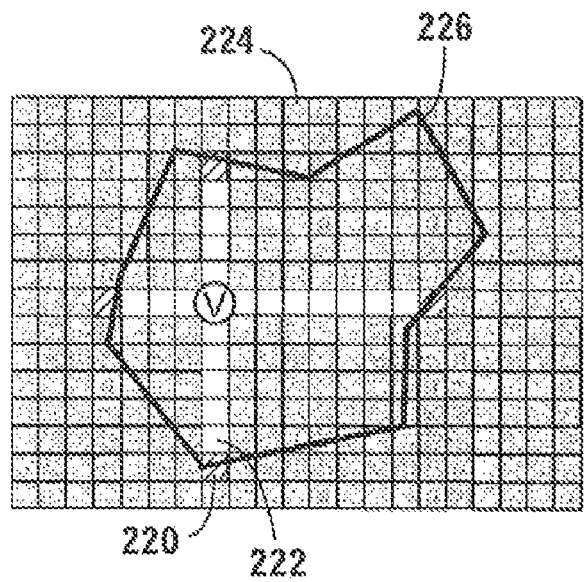
FIGS. 14A-14B show two-dimensional slices of a 3D evidence grid derived from the SLAM methodology of the present invention.
Figure 14B:
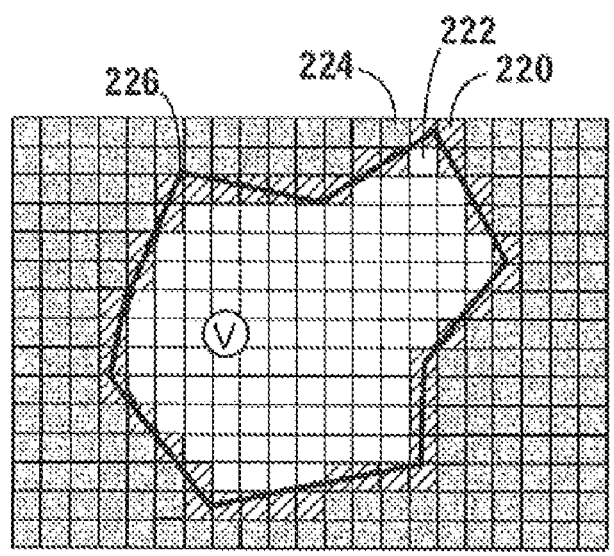

For example, FIG. 14A shows a two-dimensional slice of a 3D evidence grid derived following four sonar pings—one each in the up, down, left and right directions. FIG. 14B shows a two-dimensional slice of a 3D evidence grid following hundreds of pings in all directions. In FIGS. 14A-14B, hatched voxels 220 represent a high probability that the volume represented by the voxel is occupied based on the sonar measurements. Clear voxels 222, on the other hand, represent spaces that have a high probably of being empty. Shaded cells 224 are unknown and represent volumes that are equally probably of being occupied or empty. The solid line 226 represents the virtual position of a boundary within the evidence grid, and the circle V represents the true vehicle position.

A major drawback of the 3D evidence grid approach, however, is that the memory required to store evidence grids increases as the cube of the size of the map. For reasonable map sizes and resolutions, the memory requirements quickly become intractable, especially considering that the particle filter described infra requires hundreds of maps.

To circumvent this storage and processing problem, the embodiment uses a Deferred Reference Counting Octree (DCRO) data structure described by Fairfield et al. (2007). The DRCO exploits shared regions between particle maps and efficiently represents sparse volumes, yielding a significant performance boost that allows the vehicle to represent maps that would not even fit into memory as a uniform array.

Using 3D evidence maps, the vehicle is then able to estimate the probability distribution at time t for all possible vehicle states s and world maps using all previous sensor measurements $Z_t$ and control commands $U_t$. This is known as the SLAM posterior and may be represented as:

$$p(s, \Theta | Z_t, U_t)$$

While usually intractable to solve in closed form, the SLAM poster can be factored (Murphy 1999) as [new posterior =η×measurement model ×∫(motion model)(old posterior) $ds_{t-1}$], or $$p(s_t, \Theta | Z_t, U_t) = \eta \times p(z_t | s_t, \Theta) \times \int p(s_t | s_{t-1}, u_t) p(s_{t-1}, \Theta | Z_{t-1}, U_{t-1}) ds_{t-1},$$

a combination of the distribution of vehicle trajectories and the distribution of maps (where η is a Bayesian normalization factor). It is often very hard to express these distributions in closed form, and so a particle filter maintains a discrete approximation of the SLAM posterior using a large set of samples, or particles. Because the posterior is factorized into trajectory and map distributions, the particles are actually a specific trajectory and map pair. In fact, given a vehicle trajectory, the map can be interactively updated as discussed supra. This is known as Rao-Blackwell factorization (Doucet et al. 2000).

The algorithm of the present invention comprises the following steps:

Initialize. The particles start with their poses initialized according to some initial distribution and their maps optionally containing some prior information about the world. This is called prior distribution.

Predict. The dead-reckoned position innovation is computed using the navigation sensor. A new pose is predicted for each particle using a vehicle motion model. This new distribution of the particles is called the proposal distribution.

Weight. A weight is computed for each particle by comparing the real range measurements to ranges simulated by ray-tracing with the particle pose and map. A particle that has a pose and map that are consistent with the real range measurements will have a high weight, whereas particles which are inconsistent will have low weights.

Resample. The algorithm resamples the set of particles according to the weights such that particles with low weights are likely to be discarded and particles with high weights are likely to be duplicated (poses and maps). The resample set of particles is now the new estimate of the new SLAM posterior.

Update. The measurements are inserted into the particle maps as described supra to update the evidence of all the voxels that lie in the conic sonar beam model of each measurement relative to the particle position.

Estimate. A position estimate is generated from the particles. When SLAM is being used to provide a pose for the rest of the vehicle control software, it is desirable to turn the set of particles into a single point estimate.

The predicting, weighing, resample, updating and estimating steps are then repeated.

Figure 15A:
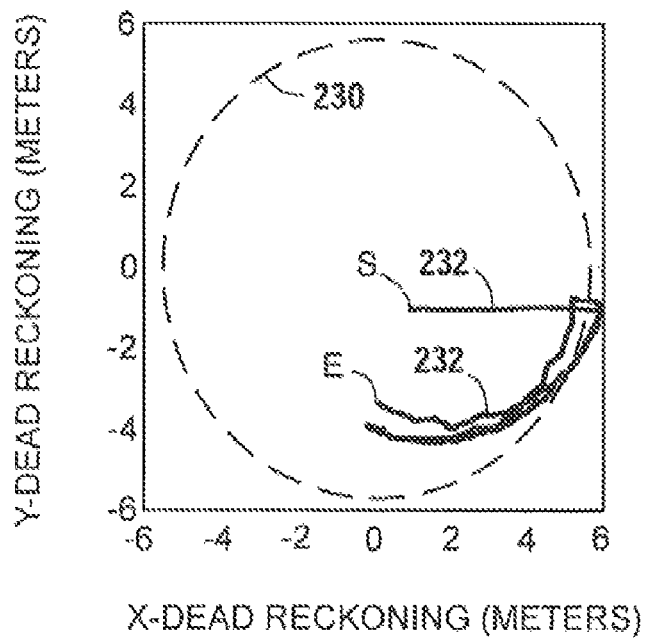
FIG. 15A-15B show experimental results of the effectiveness of the SLAM methodology.
Figure 15B:
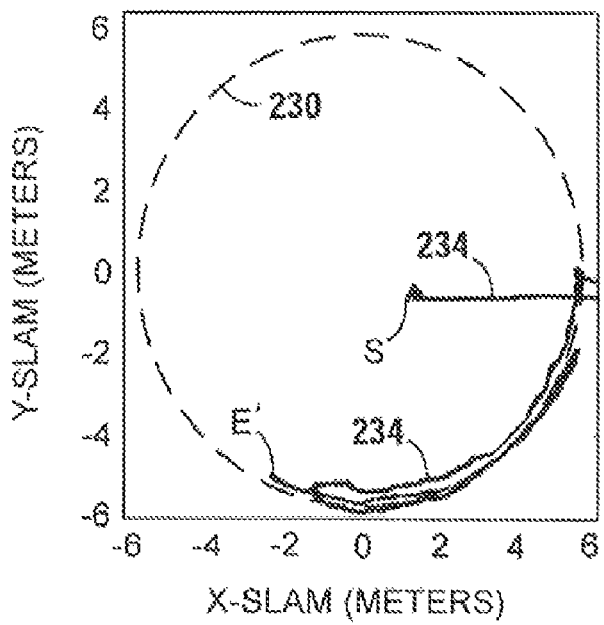

FIG. 15A-15B show experimental results of the effectiveness of the algorithm described herein. The vehicle represented in these figures was programed to execute a proximity operation starting from position S at coordinates [1, −1] and proceeding to a wall standoff distance of two meters in a circular test tank. The vehicle was then to follow the wall clockwise to a point ninety-degrees from the contact point, and then cycle back and forth along the same segment of the wall, while maintaining a standoff distance of two meters. The circle 230 represents the two meter target standoff circle. The trace 232 in FIG. 15A represents the dead-reckoned vehicle trajectory, while the trace 234 in FIG. 15B represents the SLAM-localized vehicle trajectory. The ending point E' of the vehicle in FIG. 15B is significantly closer to the intended standoff distance than the ending point E of the vehicle in FIG. 15A.

The present invention is described above in terms of a preferred illustrative embodiment of a specifically described autonomous underwater vehicle, as well as alternative embodiments thereof. Those skilled in the art will recognize that alternative constructions of such an assembly can be used in carrying out the present invention. Other aspects, features, and advantages of the present invention may be obtained from a study of this disclosure and the drawings, along with the appended claims.

We claim:

1. An underwater vehicle for operating in an underwater environment, said underwater vehicle comprising:
   a source of power;
   an axi-symmetric framing system rotatable about a centerline to define a shell of revolution having a uniformly-convex outer boundary;
   a narrow-beam sonar array connected to said source of power and mounted on said axi-symmetric framing system, said narrow-beam sonar array having a first and third plurality of transducers distributed evenly over said outer boundary within a first plane, a second and fourth plurality of transducers distributed evenly over said outer boundary within a second plane, and a plurality of lateral imaging transducers orientated to project within a third plane that is orthogonal to said first and second planes;
   a plurality of digital signal processors connected to said narrow-beam sonar array; and
   a plurality of bidirectional circumferential thrusters connected to said source of power and mounted to said axi-symmetric framing system, said plurality of bidirectional circumferential thrusters being oriented to selectively cause rotation of said axi-symmetric framing system and propulsion of said vehicle within said underwater environment, said plurality of circumferential thrusters positioned within said shell of revolution;
   wherein each transducer of said plurality of transducers is configured to project a beam having a width of no more than two degrees radially outwardly along an associated beam path, and the angle of separation between beam paths is at least ten degrees.

2. The underwater vehicle of claim 1 wherein each of said transducers comprises a projector and a corresponding hydrophone, each of said hydrophones is operative to receive a reflected signal originating from its corresponding projector to (a) determine the position of said underwater vehicle within said underwater environment; (b) map said underwater environment; and/or (c) move within said underwater environment.

3. The underwater vehicle of claim 1 further comprising at least one vertical thruster mounted to said axi-symmetric framing system and positioned within said shell of revolution.

4. The underwater vehicle of claim 1 further comprising at least one flotation panel mounted to said axi-symmetric framing system.

5. The underwater vehicle of claim 1 wherein said plurality of transducers further comprises:
   a plurality of obstacle avoidance transducers; and
   a plurality of fine imaging transducers.

6. The underwater vehicle of claim 5 wherein said plurality of digital signal processors further comprises:
   a first digital signal processor stack connected to said plurality of obstacle avoidance transducers; and
   a second digital signal processor stack connected to said plurality of fine imaging transducers.

7. The underwater vehicle of claim 1 further comprising a main processor bank contained within a pressure housing mounted to said axi-symmetric framing system.

8. The underwater vehicle of claim 7 further comprising a motor control system contained within a pressure housing and electrically connected to said main processor, said motor control system operative to actuate said circumferential thrusters.

9. The underwater vehicle of claim 7 further comprising a Doppler velocity log electrically connected to said main processor bank.

10. The underwater vehicle of claim 7 further comprising an inertial measurement unit contained within a pressure housing and electrically connected to said main processor bank.

11. The underwater vehicle of claim 7 further comprising:
    a variable buoyancy system contained within a pressure housing and electrically connected to said main processor bank;
    a ballast chamber connected to said variable buoyancy system; and
    at least one gas supply tank in fluid communication with said ballast chamber.

12. The underwater vehicle of claim 1 wherein said plurality of circumferential thrusters comprises:
    a first pair of circumferential thrusters mounted to said axi-symmetric framing system at positions distal from said centerline and orientated to provide thrust in a first direction perpendicular to said centerline; and
    a second pair of circumferential thrusters mounted to said axi-symmetric framing system at positions distal from the centerline and orientated to provide thrust in a second direction perpendicular to said centerline, wherein said second direction is coplanar with and orthogonal to said first direction.

13. The underwater vehicle of claim 7 further comprising a processor-readable medium electrically connected to said main processor bank, said processor-readable medium comprising a set of computer readable instructions for estimating a trajectory of the vehicle, the set of instructions comprising:

constructing a 3D compact map data structure representative of the surrounding environment within said processor-readable medium;
initiating a set of particles within said processor-readable medium, each particle of the set having an associated pose;
predicting a new pose for each particle of the set of particles using dead reckoning navigation;
taking real range measurements of the vehicle environment;
assigning a weight to each particle of the set of particles by comparing the real range measurements to simulated range measurements derived by ray-tracing with the particle pose and map, wherein the weight for a particle having a pose and map consistent with real range measurements is high and the weight for a particle having pose and map that are inconsistent with real range measurements is low;
resampling the set of particles according to the assigned weights, wherein particles with low weights are likely to be discarded and particles with high weights are likely to be duplicated;
updating said 3D compact map data structure based on the real range measurements; and
generating a position estimate of the vehicle within the vehicle environment from the set of particles.

* * * * *